(12) United States Patent
Gretz

(10) Patent No.: US 8,076,575 B1
(45) Date of Patent: Dec. 13, 2011

(54) ELECTRICAL BOX ASSEMBLY FOR MOUNTING AND SUPPORTING A SECURITY CAMERA OR FIXTURE

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 431 days.

(21) Appl. No.: 12/456,156

(22) Filed: Jun. 12, 2009

(51) Int. Cl.
*H02G 3/08* (2006.01)

(52) U.S. Cl. ............ 174/50; 174/481; 174/53; 174/58; 220/3.2; 220/3.3; 220/4.02; 248/906

(58) Field of Classification Search .................. 174/480, 174/481, 50, 53, 57, 58; 220/3.2–3.9, 4.02; 248/906, 343
See application file for complete search history.

(56) References Cited

U.S. PATENT DOCUMENTS

| | | | |
|---|---|---|---|
| 4,297,525 A * | 10/1981 | Bowden, Jr. .................. 174/58 |
| 5,032,856 A | 7/1991 | McMinn | |
| 5,418,567 A | 5/1995 | Boers et al. | |
| 5,434,359 A * | 7/1995 | Schnell .......................... 174/58 |
| 5,790,910 A | 8/1998 | Haskin | |
| 6,170,685 B1 * | 1/2001 | Currier ......................... 220/3.3 |
| 6,346,674 B1 * | 2/2002 | Gretz ............................ 174/58 |
| 6,476,856 B1 | 11/2002 | Zantos | |
| 6,737,576 B1 * | 5/2004 | Dinh .............................. 174/50 |
| 6,889,943 B2 * | 5/2005 | Dinh et al. .................... 248/906 |
| 7,300,025 B2 * | 11/2007 | Korcz ........................... 248/906 |
| 7,462,066 B2 | 12/2008 | Kohen | |
| 7,525,043 B1 * | 4/2009 | Gretz ............................. 174/50 |
| 7,557,308 B2 * | 7/2009 | Dinh ............................ 174/481 |

* cited by examiner

*Primary Examiner* — Angel R Estrada

(57) ABSTRACT

An electrical box assembly for mounting a security camera or an electrical fixture on a wall or ceiling. The electrical box assembly includes an electrical box with a sidewall and back wall defining an enclosure therein. A flange extends laterally from the rim of the sidewall. A plurality of rotatable flags, adjustable from the front of the electrical box assembly, are tightened to secure the assembly to the wallboard in a ceiling or wall. Wall preparation for installation of the electrical box assembly requires only a round hole in the wallboard, which can be easily provided by a hole-saw. Recessed areas in the sidewalls of the electrical box enable retracting of the flags to enable easy insertion of the sidewalls within the hole in the wallboard. An adapter plate enables the mounting of a security camera to the electrical box assembly.

19 Claims, 9 Drawing Sheets

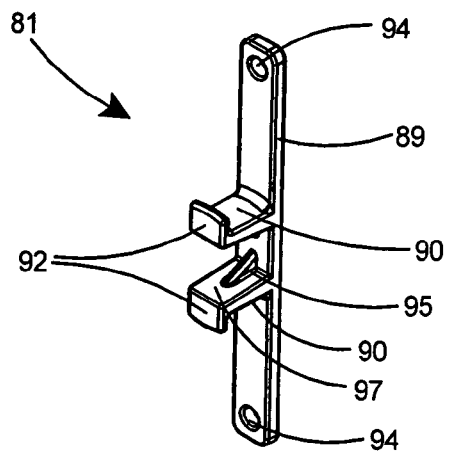
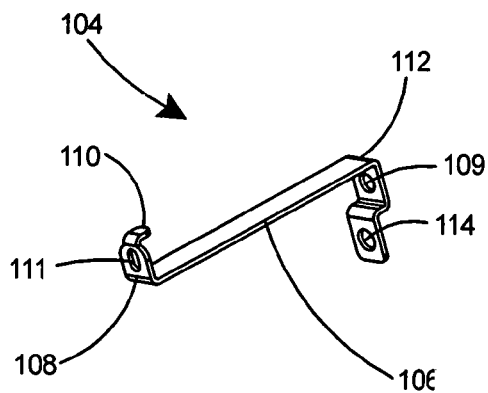
Fig. 13                    Fig. 14
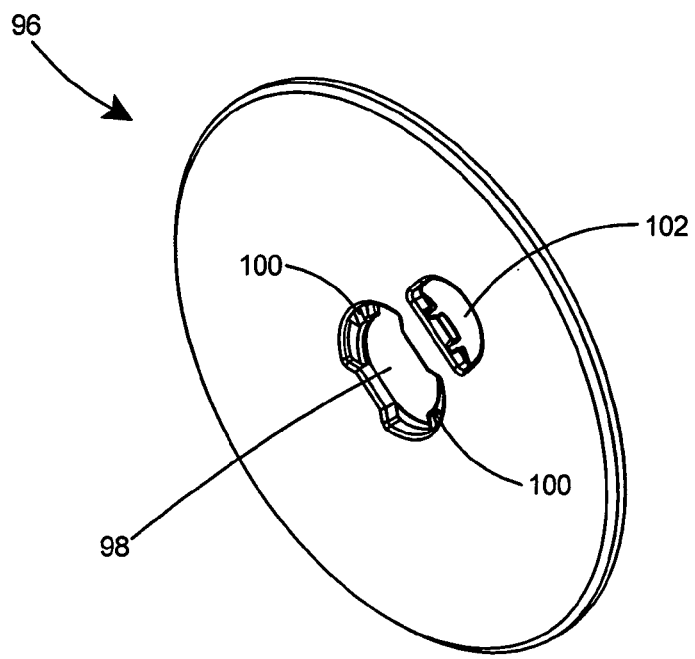
Fig. 15

ELECTRICAL BOX ASSEMBLY FOR MOUNTING AND SUPPORTING A SECURITY CAMERA OR FIXTURE

FIELD OF THE INVENTION

This invention relates to the installation of electrical components and specifically to an electrical box for mounting a security cameras or electrical fixtures on a wall, ceiling, or similar surface.

BACKGROUND OF THE INVENTION

Security cameras and electrical fixtures are commonly installed on the interiors and exteriors of buildings. Security cameras are frequently installed to provide monitoring of property against intrusion, vandalism, or theft. Electrical fixtures, such as lighting fixtures, are also frequently installed. Electrical fixtures typically run on house current and therefore all electrical connections to the fixtures must be contained within a closed electrical box that is in compliance with all local electrical codes. Although most security cameras are powered by 24 volts, many jurisdictions now require that the electrical connections also be contained within a closed electrical box that meets the electrical code.

As security cameras and light fixtures are typically installed on ceilings or walls, it is desirable to recess the electrical connections within the walls of the building in order to occlude the view of the box that holds the electrical connections as much as possible. Conventional electrical boxes are typically not adaptable to accepting either a security camera or an electrical fixture, therefore requiring the installer to purchase an electrical box that is specifically adapted to either the security camera or to the electrical fixture.

What is needed therefore is an electrical box that can be used for installing either an electrical fixture or a security camera on a wall or ceiling. The electrical box should be capable of being easily adapted for the rapid installation of either an electrical fixture or a security camera on a wall or ceiling. Providing one electrical box that is capable of serving two functions reduces stocking requirements and reduces the amount of equipment that must be hauled to the job site by the installer. The mounting of the electrical box should require only the use of a standard hole-saw for preparation of the ceiling or wall.

SUMMARY OF THE INVENTION

The invention is an electrical box assembly for mounting a security camera or an electrical fixture on a wall or ceiling. The electrical box assembly includes an electrical box with a sidewall and back wall defining an enclosure therein. A flange extends laterally from the bottom end of the sidewall. A plurality of rotatable flags, adjustable from the front of the electrical box assembly, are tightened to secure the assembly to the wallboard in a ceiling or wall. Wall preparation for installation of the electrical box assembly requires only a round hole in the wallboard, which can be easily provided by a hole-saw. Recessed areas in the sidewalls of the electrical box enable retracting of the flags to enable easy insertion of the sidewalls within the hole in the wallboard. An adapter plate enables the mounting of a security camera to the electrical box assembly.

OBJECTS AND ADVANTAGES

Several advantages are achieved with the electrical box assembly of the present invention, including:

(1) The electrical box assembly provides a mounting platform for both security cameras and electrical fixtures.

(2) The electrical box assembly provides a rapid means of installing security cameras and electrical fixtures on either walls or ceilings.

(3) Wall preparation time is greatly reduced as a standard hole-saw and a single hole are all that are required for installation of the electrical box.

(4) The electrical box assembly is capable of supporting up to a 50 pound load with the connection of a support wire to the electrical box.

(5) The electrical box assembly provides a secure enclosure for holding wiring connections, including 110 volt AC or 24 volt DC current.

(6) An adapter plate enables rapid mounting of a security camera to the electrical box assembly.

These and other objects and advantages of the present invention will be better understood by reading the following description along with reference to the drawings.

DESCRIPTION OF THE DRAWINGS

FIG. 13 is a perspective view of a mounting bar that can be used with the electrical box assembly of the present invention for mounting a security camera to the assembly.

FIG. 14 is a perspective view of a grounding strap that can be used with the electrical box assembly of the present invention.

FIG. 15 is a perspective view of an adapter plate that form a portion of the electrical box assembly for mounting a security camera thereto.

INDEX TO REFERENCE NUMERALS IN DRAWINGS

| | |
|---|---|
| 20 | electrical box assembly |
| 22 | electrical box |
| 24 | sidewall |
| 26 | back wall |
| 28 | electrical enclosure |
| 29 | sidewall end |
| 30 | mounting arrangement |
| 32 | mounting fastener |
| 34 | rotatable flag |
| 38 | flange |
| 40 | mounting boss |
| 42 | oversize bore in mounting boss |
| 44 | proximal end of flag |
| 46 | distal end of flag |
| 48 | bore in flag |
| 50 | foot |
| 52 | tab |
| 54 | flat face |
| 56 | recessed area |
| 58 | extended configuration |
| 60 | tie-off bar |
| 62 | knockout area |
| 64 | aperture in tie-off bar |
| 66 | open channel |
| 68 | rim |
| 70 | second channel |
| 72 | bore |
| 74 | retracted configuration |
| 76 | directional arrow |
| 78 | directional arrow |
| 80 | security camera |
| 81 | mounting bar |
| 82 | bar fastener |
| 83 | fastening arrangement |
| 84 | post |
| 86 | bore in post |
| 88 | opening of electrical box |
| 89 | base of mounting bar |
| 90 | prong on mounting bar |
| 92 | tab on mounting bar |
| 94 | aperture |
| 95 | strut |
| 96 | adapter plate |
| 97 | inside surface of prong |
| 98 | central aperture |
| 100 | flange on adapter plate |
| 102 | wiring aperture |
| 104 | ground strap |
| 106 | central bar |
| 108 | first end |
| 109 | second end |
| 110 | tab on ground strap |
| 111 | aperture |
| 112 | first aperture |
| 114 | second aperture |
| 116 | groove in electrical box |
| 117 | screw |
| 118 | aperture in adapter plate |
| 120 | directional arrow |
| 122 | ceiling |
| 124 | support wire |
| D1 | diameter of sidewall of electrical box |
| Θ1 | angle of rotation of flag to extend or retract |
| Θ2 | angle of rotation for securing adapter plate |

DETAILED DESCRIPTION OF THE INVENTION

Figure 1:
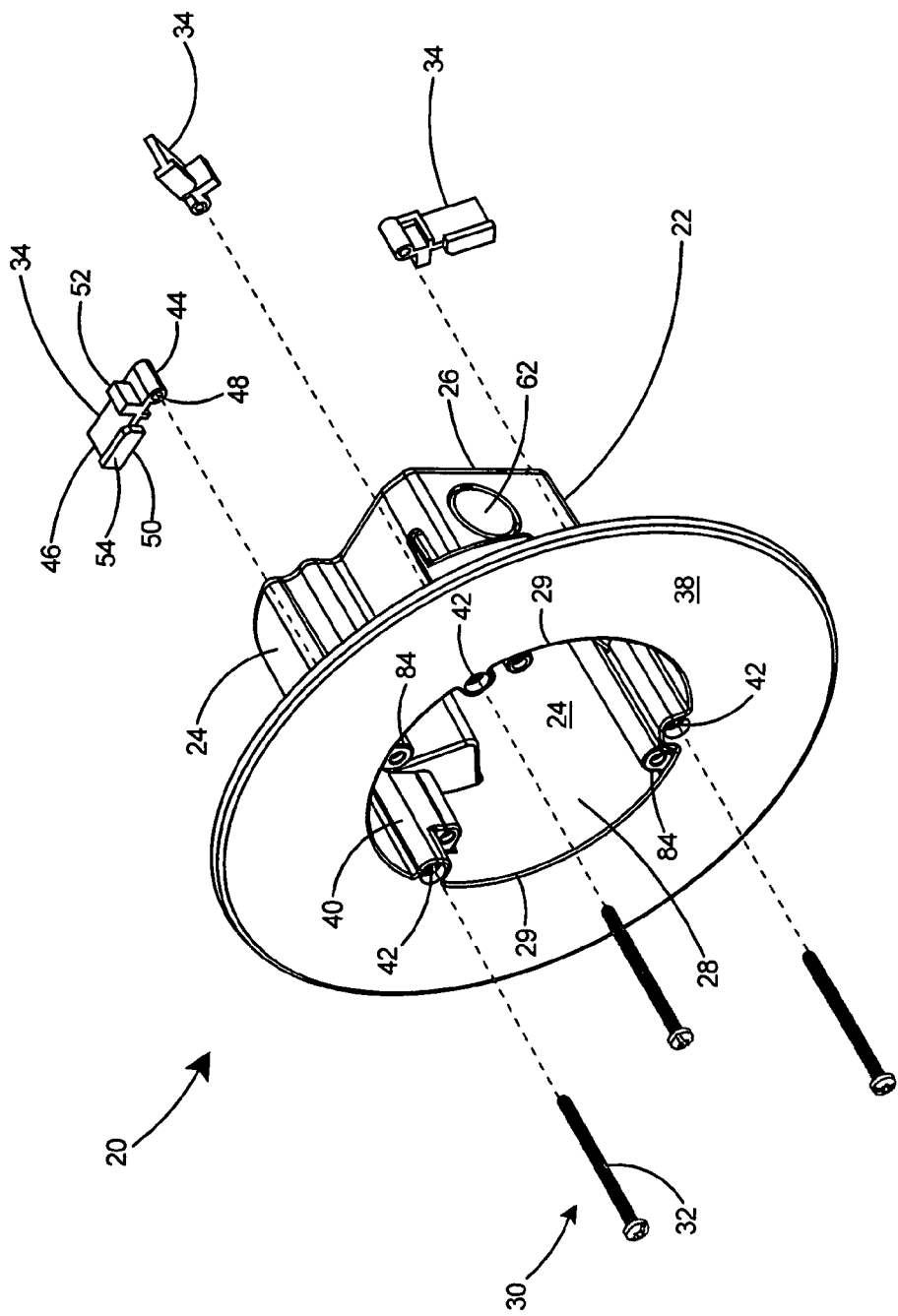
FIG. 1 is a perspective view of the preferred embodiment of an electrical box assembly according to the present invention.

Referring to FIG. 1 there is shown a preferred embodiment of an electrical box assembly 20 according to the present invention, with portions of the assembly exploded away for clarification. The electrical box assembly 20 includes a one-piece electrical box 22 with a sidewall 24 and a back wall 26 defining an electrical enclosure 28 therein. Sidewall 24 includes an end 29. A mounting arrangement 30, shown exploded away from the electrical box 22, includes mounting fasteners 32 and rotatable flags 34. The sidewall 24 of the electrical box 22 includes a sidewall end 29 and a flange 38 extending laterally from the sidewall end 29.

The one-piece electrical box 22 includes mounting bosses 40 that are integral with the sidewall 24. The mounting bosses 40 include bores 42 therein which are oversize with respect to the mounting fasteners 32, thus enabling the mounting fasteners 32 to turn freely in bores 42 after they are inserted there through. Each rotatable flag 34 is substantially rectangular shaped with a proximal end 44 at which it will be attached to the mounting fastener 32, a distal end 46, a bore 48 at the proximal end 44, a foot 50 at the distal end 46, and an outward extending tab 52 laterally from the rotatable flag 34 between the proximal end 44 and distal end 46. A flat face 54 provided on the foot 50 will face the flange 38 of the electrical box 22.

Figure 2:
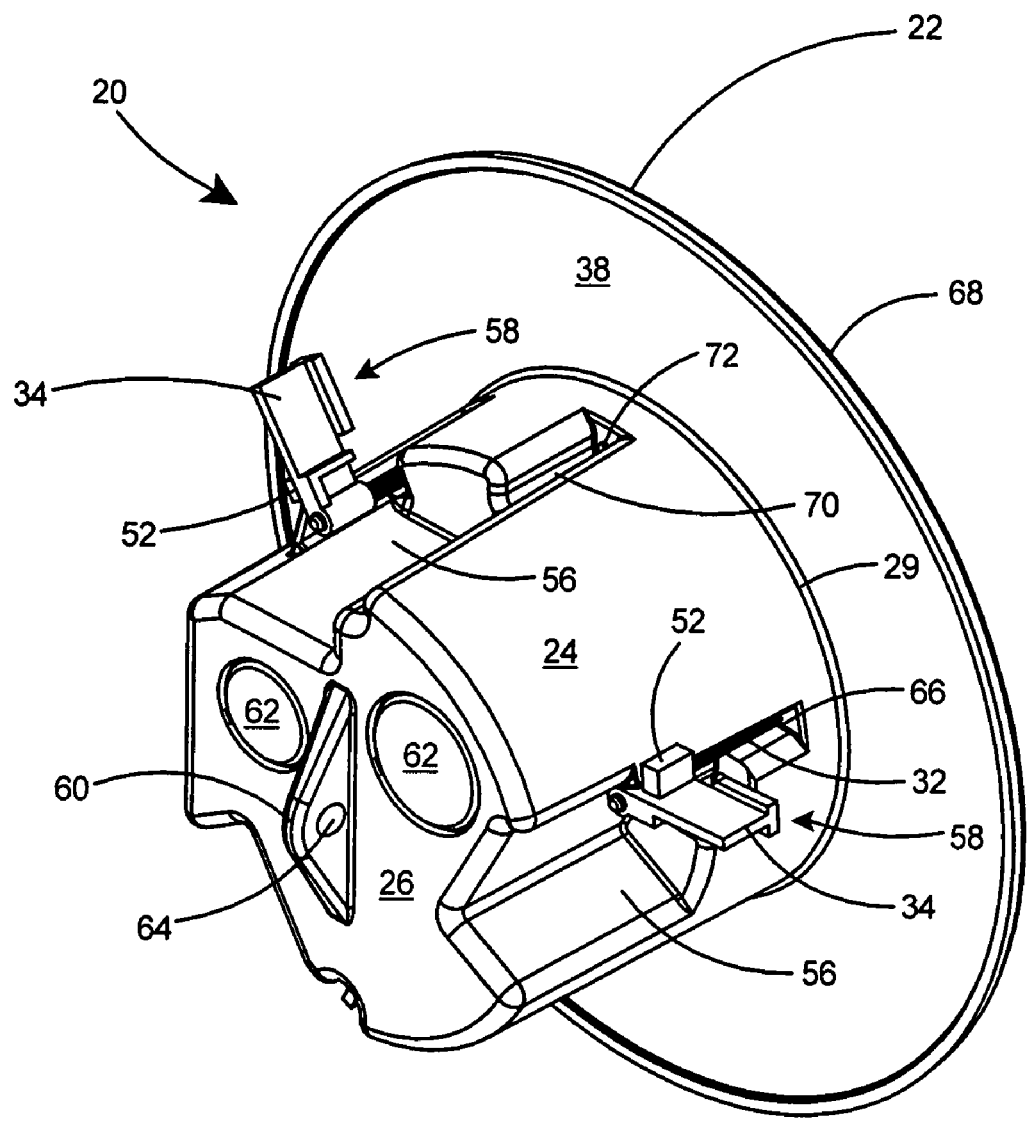
FIG. 2 is a top perspective view of the electrical box assembly of FIG. 1.

Referring to FIG. 2, the sidewall 24 of the electrical box assembly 20 includes a recessed area 56 corresponding to each of the rotatable flags 34 in the mounting arrangement 30. The rotatable flags 34 may be rotated outward or inward by rotating the mounting fasteners 32 slightly more than ¼ turn. In FIG. 2, the rotatable flags 34 are depicted rotated outward to the extended configuration 58. As shown in the top perspective view of FIG. 2, the electrical box 22 includes a tie-off bar 60 and one or more knockout areas 62 in the back wall 26. The tie-off bar 60 includes an aperture 64 therein for later attachment of a support wire (not shown) for supporting the electrical box 22 when a heavy load is suspended there from. The mounting fasteners 32 extend through open channels 66 that are adjacent each recessed area 56. When the mounting fasteners 32 are rotated clockwise as viewed from the open end of the electrical box 22, the tabs 52 engage sidewall 24 and continued clockwise rotation of the mounting fasteners will draw the rotatable flags 34 toward the flange 38 of the electrical box 22. Electrical box includes rim 68 at the outer periphery of the flange 38. Second channels 70 are provided in the sidewall 24 of the electrical box 22 in alignment with bores 72 leading from posts (not shown) within the enclosure of the electrical box.

Figure 3:
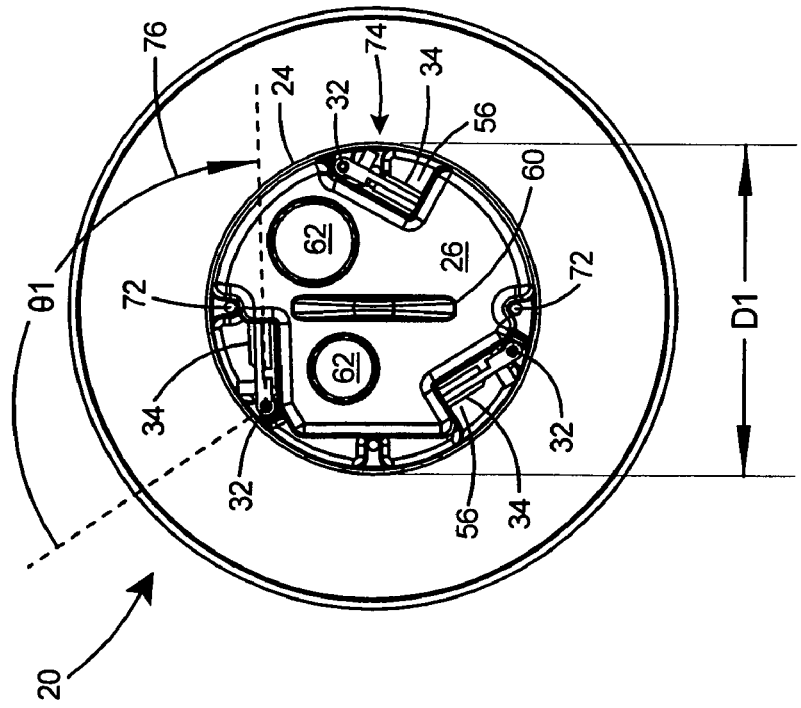
FIG. 3 is a top view of the electrical box assembly of FIG. 1 with the rotatable flags rotated inward for installation.

With reference to FIG. 3, the rotatable flags 34 of the electrical box assembly 20 can be rotated to a retracted configuration 74 wherein the rotatable flags 34 are rotated through angle Θ1 in the direction of arrow 76 until each flag 34 contacts the sidewall 24 of the electrical box 22 within the recessed area 56. With all three rotatable flags 34 rotated into the retracted configuration 74, all portions of the flags 34 are within the outer periphery of the sidewall 24 and the electrical box 22 will thus be configured for insertion through a circular hole in wallboard (not shown) created by a hole-saw.

Figure 4:
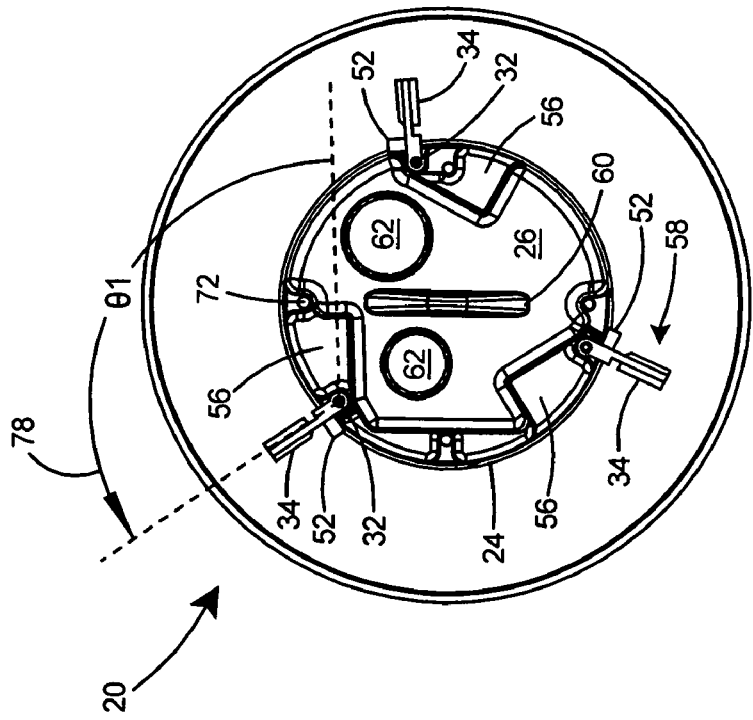
FIG. 4 is a top view of the electrical box assembly of FIG. 1 with the rotatable flags rotated outward to secure to a ceiling or wall.

FIG. 4 depicts the rotatable flags 34 rotated into their extended configuration 58 in which the wherein the rotatable flags 34 are rotated through angle Θ1 in the direction of arrow 78 until each tab 52 of flag 34 contacts the sidewall 24 of the electrical box 22. With all three rotatable flags 34 rotated into the extended configuration 58, the electrical box 22 will thus be configured for tightening of the mounting fasteners 32 in order to draw the flags 34 tightly against the wallboard (not shown) and thus clamp the electrical box 22 to the wall or ceiling. Preferably, angle Θ1 is between 120 and 125 degrees.

Figure 5:
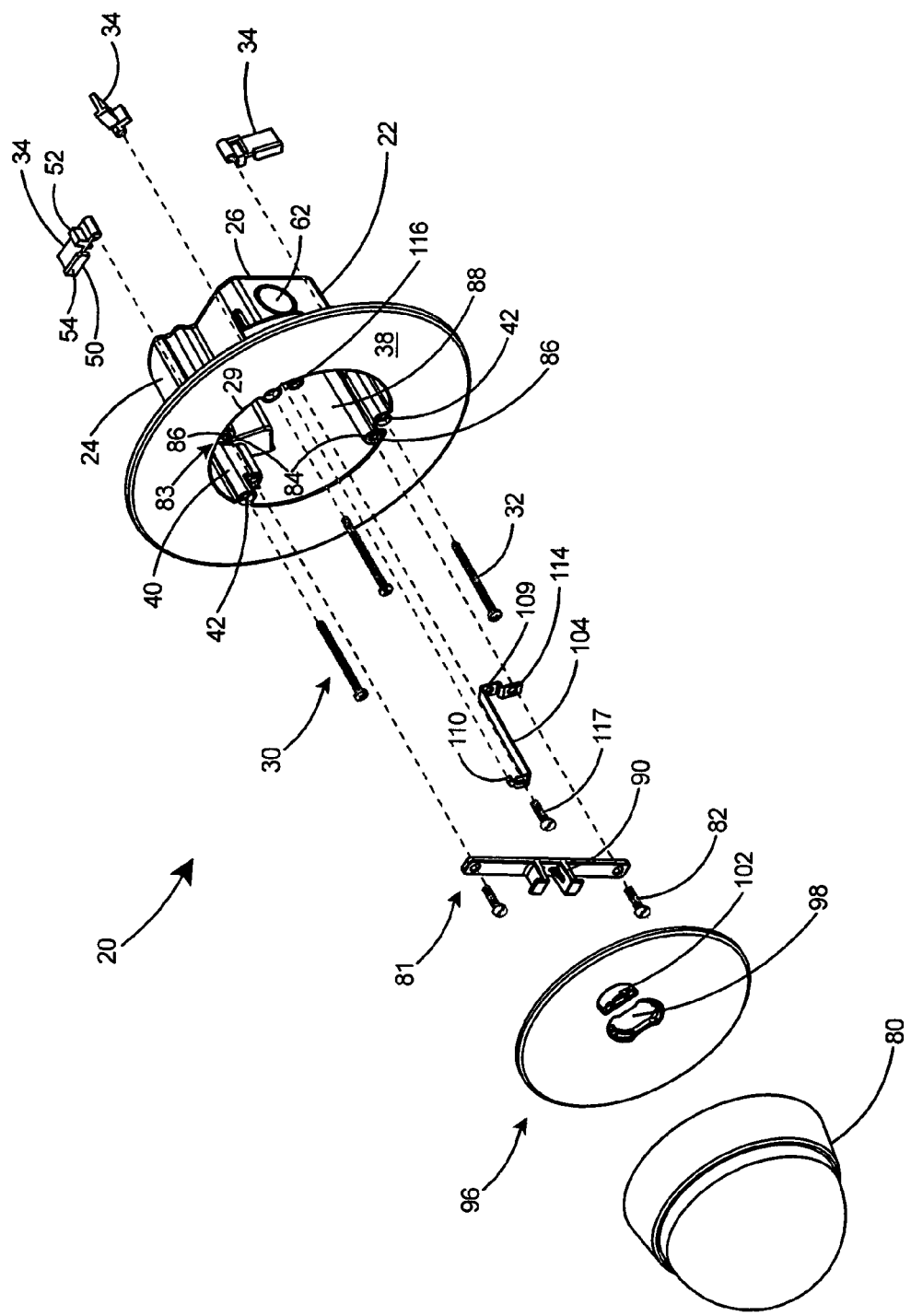
FIG. 5 is an exploded perspective view of the electrical box assembly of the present invention in alignment with a security camera that it will support.

With reference to FIG. 5, the electrical box assembly 20 of the present invention is depicted in alignment with a security camera 80 that it will support. The mounting fasteners 32 and rotatable flags 34 are shown exploded apart from the electrical box 22 for purposes of clarity. The electrical box assembly 20 is normally supplied with the mounting fasteners 32 extending through the mounting bosses 40 and the rotatable flags 34 attached to the ends of the mounting fasteners 32. In order to support the security camera 80, electrical box assembly 20 includes a mounting bar 81 that is secured with bar fasteners 82 to a fastening arrangement 83 for securing an electrical device (not shown) to the electrical box 22. The mounting bar 81 is an elongated bar preferably constructed of metal. The fastening arrangement 83 for fastening an electrical device to the electrical box 22 includes posts 84 that are integral with the sidewall 25 of the electrical box 22. Posts 84 including bores 86 therein are arranged approximately 180 degrees across the opening 88 of the electrical box 22. As shown in FIG. 13, the mounting bar 81 includes an elongated base 89, two prongs 90 extending from the base 89, tabs 92 extending at a right angle from the prongs 90, and apertures 94 for accommodating bar fasteners 82. Two struts 95 extend from the mounting bar 81 to the inside surface 97 of the prongs 90 to stiffen and support them.

As shown in FIG. 5, the fastening arrangement 83 of the electrical box assembly 20 further includes an adapter plate 96. The adapter plate 96 includes a central aperture 98 for interacting with the prongs 90 of the mounting bar 81. As shown in FIG. 15, the adapter plate 96 includes flanges 100 extending into the central aperture 98. A wiring aperture 102 is provided on the adapter plate 96 for accommodating the passage of electrical wiring (not shown) between the security camera and the electrical box.

Referring to FIG. 5, a ground strap 104 is shown in alignment with a post 84 in the electrical box 22. The ground strap 104 is constructed of metal and is provided to enable the electrical box assembly 20 to meet code in certain jurisdictions where a ground wire must be connected within a non-metallic electrical box. As shown in FIG. 14, the ground strap 104 includes a central bar 106 with two bent over ends including a first 108 and second end 109. A tab 110 and aperture 111 are provided on the first end 108 and a first aperture 112 and second aperture 114 in the second end 109. As shown in FIG. 5, electrical box 22 includes a groove 116 therein against the sidewall end 29 at the opening 88 of the electrical box. Tab 110 of ground strap 104 clips into groove 116 in electrical box 22 to hold the ground strap 104 to the electrical box 22. Connection of ground strap 104 to electrical box 22 could also be by screw 117 as shown. A ground wire (not shown) can be connected to the second end 109 of the ground strap 104 to provide electrical continuity to any electrical fixture or device that is secured to the electrical box 22. The second aperture 114 provides a place for connecting the ground wire via screw (not shown) or similar fastener.

Figure 6:
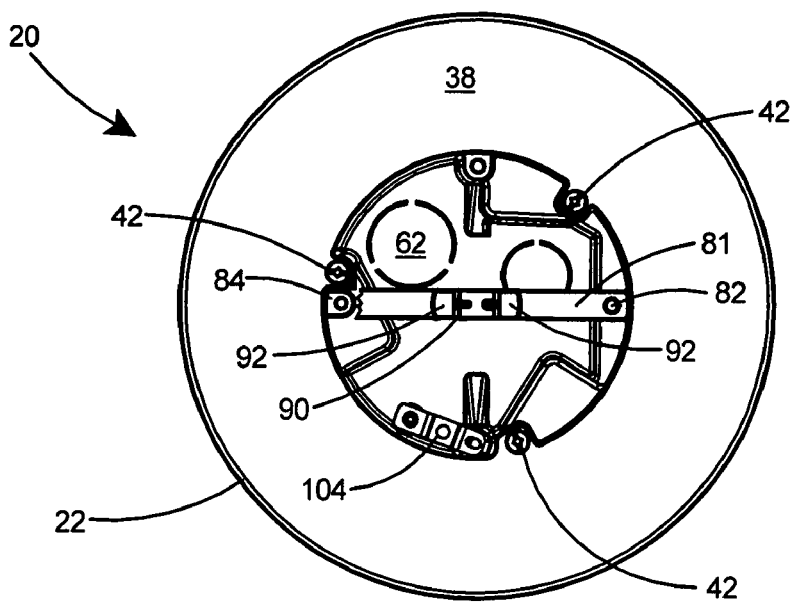
FIG. 6 is a bottom view of the electrical box assembly including the mounting bar for the adapter plate and the ground strap attached thereto.

As shown in FIG. 6, the first step in preparing the electrical box assembly 20 for receipt of a security camera (not shown) is to secure mounting bar 81 to posts 84. A portion of mounting bar 81 is broken away on the left side of the figure to show post 84, which is connected to the electrical box 22 by bar fasteners 82, one of which is depicted on the right side of the figure.

Figure 7:
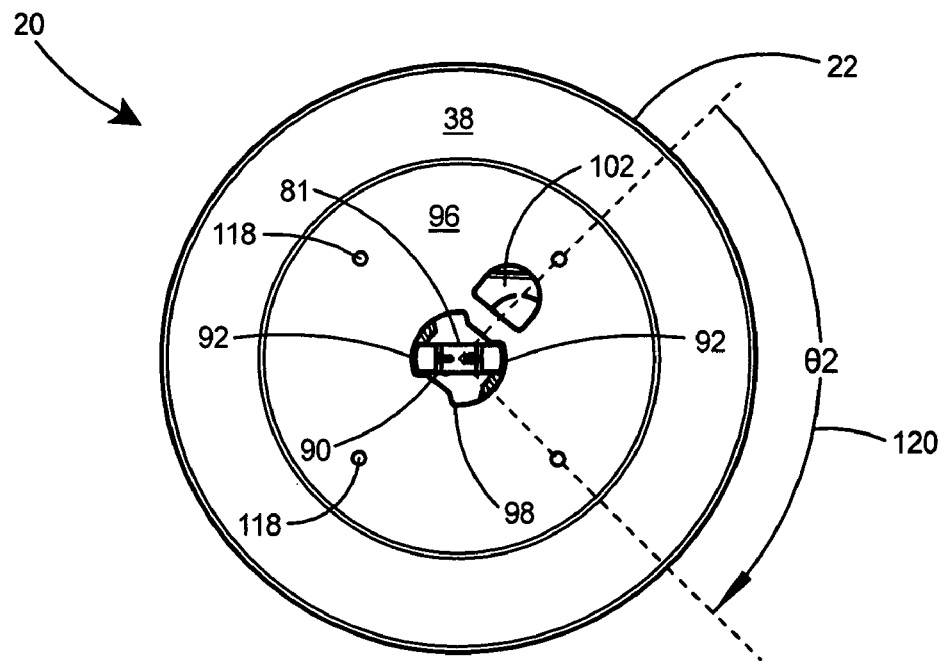
FIG. 7 is a bottom view of the electrical box assembly with the adapter plate secured thereto.

With reference to FIG. 7, after the mounting bar 81 is secured to the electrical box assembly 20, apertures 118 are drilled in the adapter plate 96 by the installer to match the pattern of posts or similar connection devices (not shown) on the security camera to prepare the adapter plate 96 for connection to the security camera. The security camera is then secured to the adapter plate 96 with fasteners (not shown). Adapter plate 96 with attached security camera is then secured to the electrical box assembly 20 by placing the central aperture 98 over the tabs 92 and prongs 90 on the mounting bar 81 and turning the adapter plate 96 through angle Θ2 or approximately one-quarter turn in the direction as shown by directional arrow 120.

Figure 8:
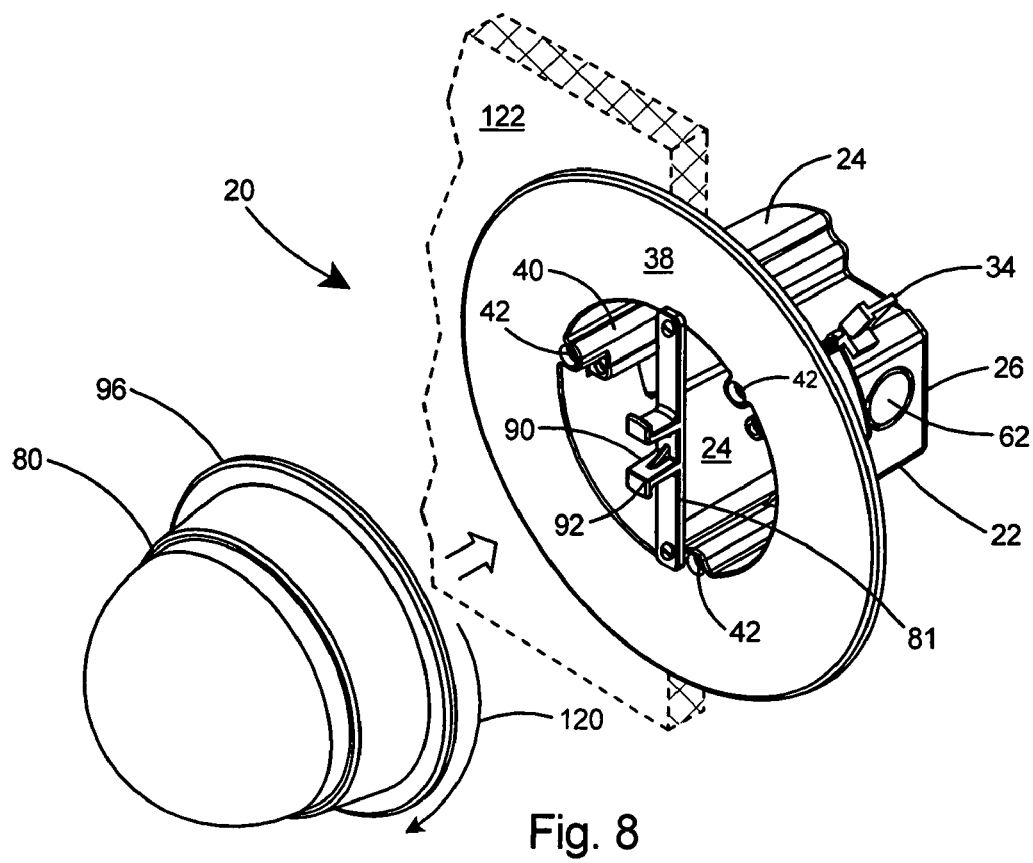
FIG. 8 is a perspective view of the electrical box assembly secured to a ceiling with an attached adapter plate and a security camera in alignment to be secured to the electrical box.

As shown in FIG. 8, after the electrical box 22 has been secured to a ceiling 122, a broken away portion of which ceiling 122 is shown, and adapter plate 96 has been secured to the electrical box assembly 20, the security camera 80 is aligned with the adapter plate 96 and secured thereto by inserting the security camera 80 over the prongs 90 and tabs 92 of the mounting bar 81 and turning approximately ¼ turn in the direction of arrow 120.

Figure 9:
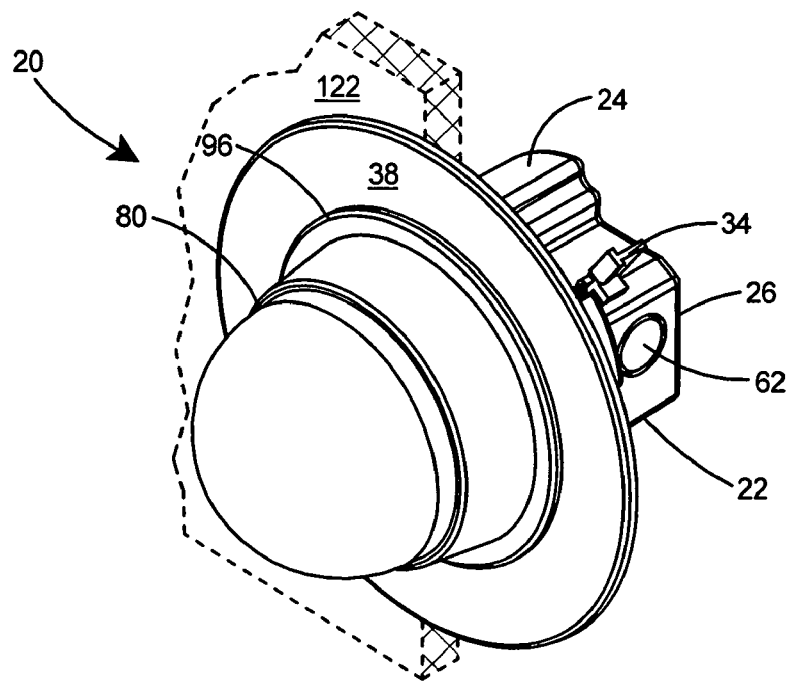
FIG. 9 is a perspective view of the electrical box assembly of FIG. 7 after the electrical box has been secured to the ceiling and a security camera secured to the electrical box assembly.

With reference to FIG. 9, the security camera 80 is shown secured to the electrical box assembly 20 which in turn is secured to the ceiling 122. Rotatable flags 34, one of which is shown, have been fully tightened against the ceiling 122 to securely hold electrical box assembly 20 and attached security camera 80 to the ceiling 122. Although the operating procedure for installing electrical box assembly 20 and security camera 80 depicted in FIGS. 8 and 9 are described with respect to a ceiling, it should be understood that electrical box assembly 20 could also be used to install a security camera 80 or similar electrical device on a wall.

Figure 10:
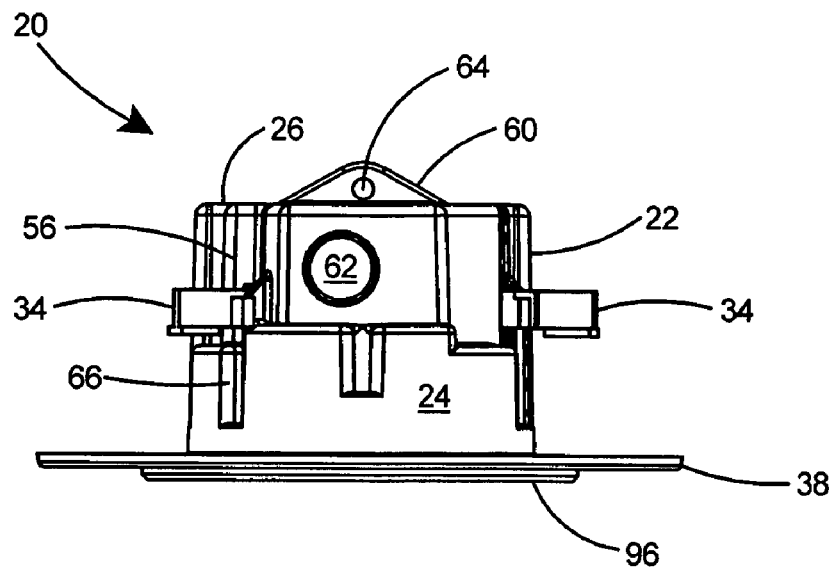
FIG. 10 is a side view of the electrical box assembly of the present invention.
Figure 11:
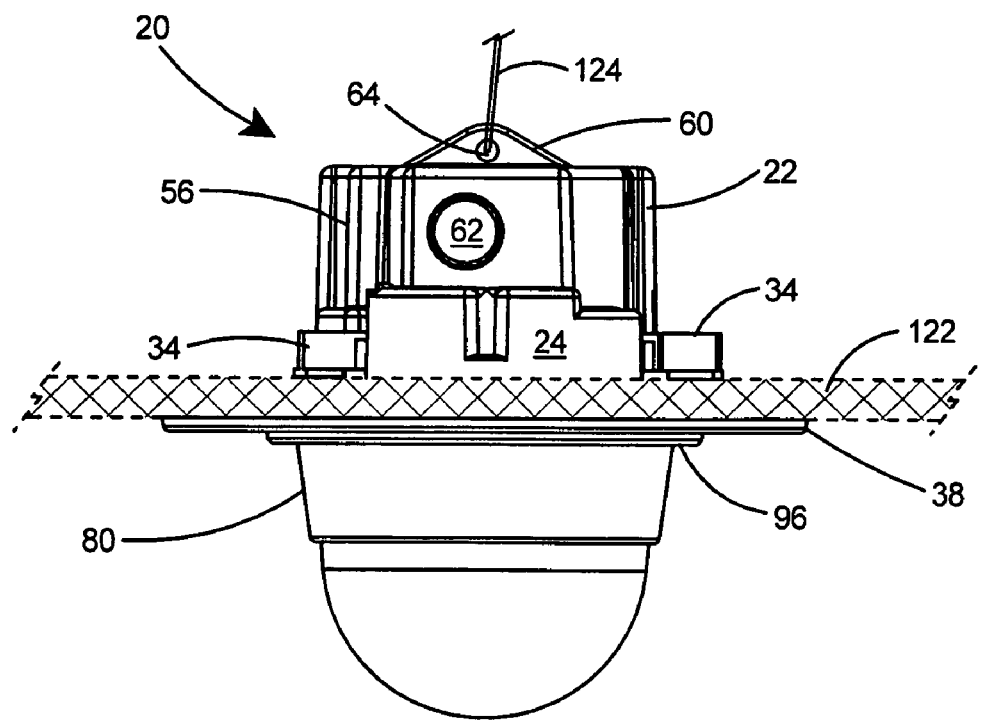
FIG. 11 is a side view of the electrical box assembly with a security camera attached thereto.

Referring to FIG. 10, the back wall 26 of the electrical box 22 includes tie-off bar 60 extending therefrom. Tie-off bar 60 includes an aperture 64 therein. As shown in FIG. 11, after electrical box assembly 20 has been secured to the wallboard of ceiling 122, a support wire 124 can be attached to the tie-off bar 60 at aperture 64 to provide support for the security camera 80. The support wire 124 is especially useful for supporting the weight of heavy electrical fixtures that may be attached to the electrical box assembly 20.

Figure 12:
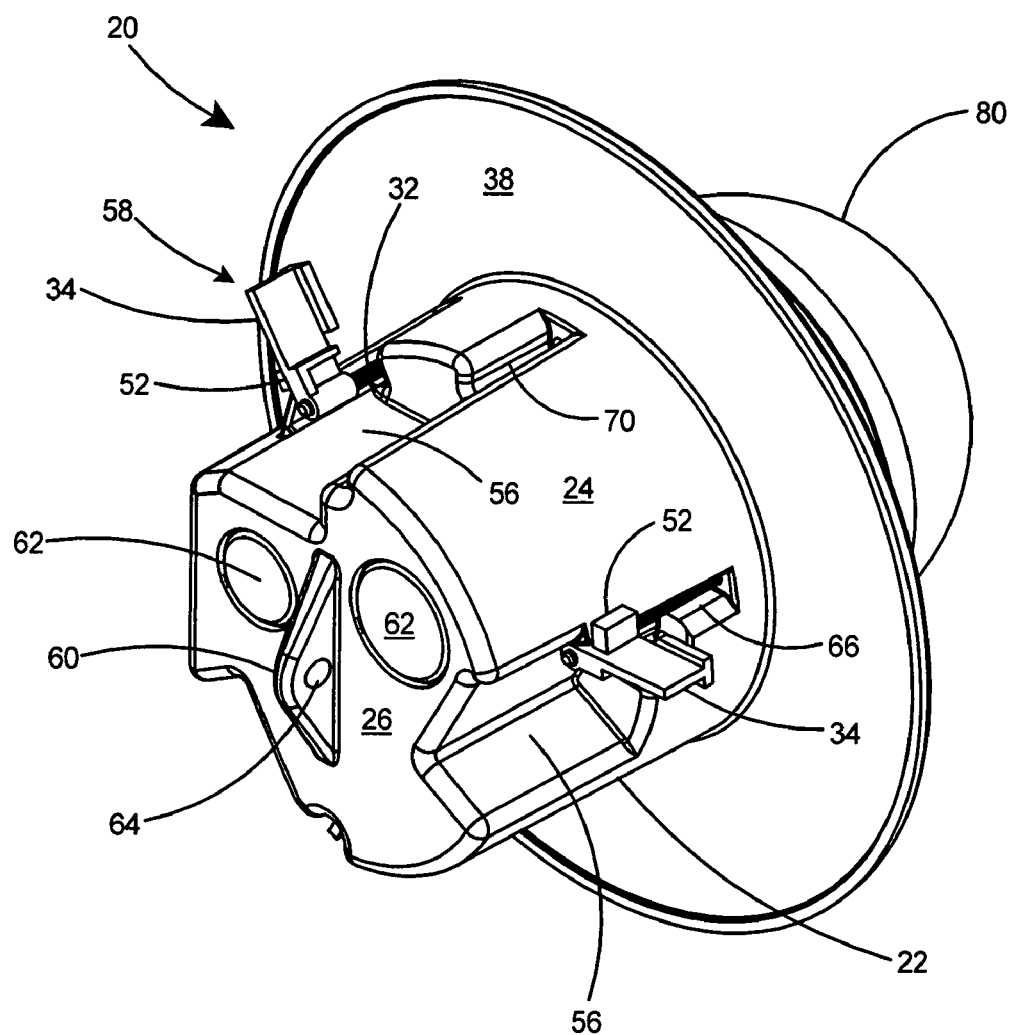
FIG. 12 is a perspective view of the electrical box assembly and security camera of FIG. 10.

With reference to the rear perspective view of the electrical box assembly 20 in FIG. 12, there is shown the mounting fasteners 32 and rotatable flags 34 in the extended configuration 58. Rotatable flags 34 have been rotated to the extended configuration 58 at which tab 52 of rotatable flag 34 engages the sidewall 24 of the electrical box 22. Knockout areas 62 can be removed to provide an aperture for leading electrical cable (not shown) into the electrical box 22. As each mounting fastener 32 is tightened to draw the rotatable flag 34 toward flange 38, open channel 66 acts as a guide for the rotatable flag 34 to ride along the sidewall 24 and proceed down the channel 66 until the flag 34 engages the wall or ceiling (not shown).

As shown in FIG. 3, the sidewall 24 of the electrical box 22 includes an outer diameter D1. Preferably, the shape of sidewall 24 is circular and diameter D1 of sidewall 24 is slightly less than the size of a conventional hole-saw of a standard size. For example, for use with a 4.0-inch hole-saw, diameter D1 of sidewall 24 is slightly less than 4.0 inches. With rotatable flags 34 rotated into recesses 56 of sidewall 24, thus to their retracted configuration 74 as shown in FIG. 3, sidewall 24 of electrical box 22 can be easily inserted within a 4.0"-inch hole in a wall created by a conventional 4-inch hole-saw. For other sizes of electrical boxes 22 according to the present invention, the size of the sidewall 24 would be adjusted to a size slightly less than the size of the hole-saw that it is designed to be used in conjunction with.

Most preferably, the one-piece electrical box 22 of the present invention is molded in one piece of plastic and each of the rotatable flags 34 are molded in one piece of plastic. Preferably, the plastic is polycarbonate, polyvinyl chloride, acrylonitrile-butadiene styrene, or polyethylene. Preferably the mounting fasteners are #6×2-inch sheet metal screws.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical box assembly comprising:
   an electrical box including a sidewall and a back wall defining an electrical enclosure therein, said sidewall including an end;
   a flange on said electrical box, said flange extending laterally from said end of said sidewall;
   a mounting arrangement for securing said electrical box to a support;
   said mounting arrangement including a plurality of mounting bosses integral with said sidewall of said electrical box, a mounting fastener extending through each of said mounting bosses, and a rotatable flag secured to each of said mounting fasteners;
   a fastening arrangement for securing an electrical device to said electrical box assembly, said fastening arrangement including a plurality of posts integral with said sidewall of said electrical box, each of said posts including a bore therein;
   said fastening arrangement includes a mounting bar having apertures therein; and
   bar fasteners for securing through said apertures in said mounting bar into said posts in said electrical box.

2. The electrical box assembly of claim 1 including a plurality of recessed areas in said sidewall of said electrical box, said sidewall including a recessed area corresponding to each of said rotatable flags, whereby said recessed areas enable retracting of each of said rotatable flags to enable easy insertion of said sidewalls within a circular hole in a wall.

3. The electrical box assembly of claim 2 wherein
   said rotatable flag includes a proximal end and a distal end;
   a bore in said proximal end of said rotatable flag; and
   a tab extending laterally from said rotatable flag between said proximal end and said distal end.

4. The electrical box assembly of claim 3 wherein
   said rotatable flag includes a foot at said distal end;
   said foot includes a flat face; and
   said flat face is oriented toward said flange of said electrical box.

5. The electrical box assembly of claim 3 wherein
   each of said mounting bosses include a bore therein; and
   said bores in said mounting bosses are oversize with respect to said mounting fasteners thus enabling said mounting fasteners to turn freely in bores.

6. The electrical box assembly of claim 1 wherein
   said sidewall of said electrical box includes an outer diameter; and
   said outer diameter of said electrical box is slightly less than the size of a standard hole-saw.

7. The electrical box assembly of claim 1 wherein
   said electrical box includes a tie-off bar extending from said back wall of said electrical box; and
   said tie-off bar includes an aperture therein.

8. The electrical box assembly of claim 1 wherein said electrical box includes one or more knockout areas in said back wall of said electrical box.

9. The electrical box assembly of claim 2 wherein
   said mounting fasteners extend through open channels in said sidewall of said electrical box, one of said open channels is adjacent to each of said recessed areas; and
   as each of said mounting fasteners is tightened to draw said rotatable flag toward said flange, said open channel acts as a guide for said rotatable flag thereby enabling said rotatable flag to ride along said sidewall and proceed down said open channel until said rotatable flag engages the wall.

10. The electrical box assembly of claim 1 including second channels in said sidewall of said electrical box, said second channels in alignment with said bores of said posts.

11. The electrical box assembly of claim 1 wherein said mounting bar is an elongated bar constructed of metal.

12. The electrical box assembly of claim 1 wherein said mounting bar includes
    an elongated base;
    two prongs extending from said base; and
    tabs extending from the prongs.

13. The electrical box assembly of claim 12 wherein
    said prongs include an inside surface; and
    said mounting bar includes a strut extending from said mounting bar to said inside surface of each of said prongs.

14. The electrical box assembly of claim 1 wherein
    said fastening arrangement of said electrical box assembly includes an adapter plate; and
    a central aperture in said adapter plate.

15. The electrical box assembly of claim 14 wherein said adapter plate includes
    flanges extending into said central aperture; and
    a wiring aperture in said adapter plate.

16. The electrical box assembly of claim 1 wherein
    said electrical box includes an opening; and
    said electrical box includes a groove therein against said sidewall end at said opening of said electrical box.

17. The electrical box assembly of claim 1 wherein said one-piece electrical box is molded of plastic.

18. The electrical box assembly of claim 17 wherein said plastic is selected from the group including polycarbonate, polyvinyl chloride, acrylonitrile-butadiene styrene, and polyethylene.

19. An electrical box assembly comprising:
    an electrical box including a sidewall and a back wall defining an electrical enclosure therein, said sidewall including an end and a groove therein;
    a flange on said electrical box, said flange extending laterally from said end of said sidewall;
    a mounting arrangement for securing said electrical box to a support;
    said mounting arrangement including a plurality of mounting bosses integral with said sidewall of said electrical box, a mounting fastener extending through each of said mounting bosses, and a rotatable flag secured to each of said mounting fasteners;
    a fastening arrangement for securing an electrical device to said electrical box assembly, said fastening arrangement including a plurality of posts integral with said sidewall of said electrical box, each of said posts including a bore therein; and
    a ground strap including a central bar and two bent over ends with a tab on a first of said ends and an aperture on a second of said ends whereby said tab of said ground strap clips into said groove in said electrical box and said aperture in said second end of said ground strap is capable of accepting a ground wire connected thereto for establishing electrical continuity to an electrical device secured to said electrical box.

* * * * *